(12) United States Patent
Chen (10) Patent No.: US 10,776,771 B2
(45) Date of Patent: Sep. 15, 2020

(54) ELECTRONIC RESOURCE PROCESSING METHOD AND DEVICE

(71) Applicant: TENCENT TECHNOLOGY (SHENZHEN) COMPANY LIMITED, Shenzhen, Guangdong (CN)

(72) Inventor: Huashan Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 313 days.

(21) Appl. No.: 15/558,905

(22) PCT Filed: Apr. 29, 2016

(86) PCT No.: PCT/CN2016/080820
§ 371 (c)(1),
(2) Date: Sep. 15, 2017

(87) PCT Pub. No.: WO2017/020618
PCT Pub. Date: Feb. 9, 2017

(65) Prior Publication Data
US 2018/0089663 A1   Mar. 29, 2018

(30) Foreign Application Priority Data

Jul. 31, 2015   (CN) .......................... 2015 1 0466213

(51) Int. Cl.
*G06Q 20/00*   (2012.01)
*G06Q 20/32*   (2012.01)
(Continued)

(52) U.S. Cl.
CPC ......... *G06Q 20/3278* (2013.01); *G06Q 20/20* (2013.01); *G06Q 20/32* (2013.01);
(Continued)

(58) Field of Classification Search
CPC ................................................. G06Q 20/3278
See application file for complete search history.

(56) References Cited

U.S. PATENT DOCUMENTS 6,516,996 B1 * 2/2003 Hippelainen .......... G06Q 20/04
235/379
2002/0026507 A1 * 2/2002 Sears ...................... H04L 41/22
709/224
(Continued)

FOREIGN PATENT DOCUMENTS

CN     101290669 A    10/2008
CN     103093351 A     5/2013
(Continued)

OTHER PUBLICATIONS

China Office Action for Application No. 201510466213.8 dated Jul. 5, 2016.
(Continued)

*Primary Examiner* — Bennett M Sigmond
*Assistant Examiner* — Scott C Anderson
(74) *Attorney, Agent, or Firm* — Sughrue Mion, PLLC (57) ABSTRACT

An electronic resource processing method and a device are provided. The method includes sending, by a first terminal, an electronic resource transfer attribute to a second terminal, generating, by the second terminal, an electronic resource transfer request, based on the electronic resource transfer attribute and an encryption identifier for performing electronic resource transfer processing, and sending, by the second terminal, the electronic resource transfer request to a server. The method further includes querying, by the server, an associated account of the second terminal, based on the encryption identifier, performing, by the server, transfer processing on electronic resources in the associated account of the second terminal, based on the electronic resource
(Continued)

transfer attribute, and notifying, by the server, the first terminal and the second terminal of a result of the transfer processing.

17 Claims, 5 Drawing Sheets

(51) Int. Cl.

| | | |
|---|---|---|
| *H04W 12/02* | (2009.01) | |
| *G06Q 20/20* | (2012.01) | |
| *G06Q 20/40* | (2012.01) | |
| *G06Q 30/06* | (2012.01) | |
| *H04L 29/06* | (2006.01) | |
| *H04W 12/00* | (2009.01) | |

(52) U.S. Cl.
CPC ....... *G06Q 20/322* (2013.01); *G06Q 20/4016* (2013.01); *G06Q 30/06* (2013.01); *H04L 63/0428* (2013.01); *H04W 12/02* (2013.01); *H04W 12/00505* (2019.01)

(56) References Cited

U.S. PATENT DOCUMENTS

| | | | | |
|---|---|---|---|---|
| 2003/0145205 | A1* | 7/2003 | Sarcanin | G06Q 20/02 713/172 |
| 2010/0153273 | A1* | 6/2010 | Sellars | G06Q 20/02 705/67 |
| 2012/0166337 | A1 | 6/2012 | Park et al. | |
| 2012/0245986 | A1* | 9/2012 | Regan | G06Q 20/20 705/14.23 |
| 2014/0188738 | A1* | 7/2014 | Huxham | H04W 12/0013 705/73 |
| 2015/0235207 | A1* | 8/2015 | Murphy, Jr. | G06Q 20/382 705/44 |

FOREIGN PATENT DOCUMENTS

| | | |
|---|---|---|
| CN | 103778531 A | 5/2014 |
| CN | 103812835 A | 5/2014 |
| CN | 104408610 A | 3/2015 |
| CN | 104616149 A | 5/2015 |
| CN | 105139200 A | 12/2015 |

OTHER PUBLICATIONS

International Search Report for PCT/CN2016/080820 dated Jul. 26, 2016 [PCT/ISA/210].

* cited by examiner

ELECTRONIC RESOURCE PROCESSING METHOD AND DEVICE

CROSS-REFERENCE TO RELATED APPLICATION

This application is a U.S. national stage application under 35 U.S.C. § 371 of International Patent Application No. PCT/CN2016/080820, filed on Apr. 29, 2016, which claims priority from Chinese Patent Application No. 201510466213.8, entitled "ELECTRONIC RESOURCE PROCESSING METHOD AND APPARATUS, AND SERVER" filed on Jul. 31, 2015, in the Chinese Patent Office, the disclosures of which are incorporated herein by reference in their entireties.

BACKGROUND

1. Field

Methods and apparatuses consistent with example embodiments relate to the fields of Internet technologies and resource processing technologies, and in particular, to an electronic resource processing method and a device.

2. Description of Related Art

In a conventional offline shopping scenario, using the supermarket shopping scenario as an example, generally, after shopping in a supermarket, a user needs to pay cash money of an equal value to a purchased article to a supermarket merchant. For this manner, the user needs to carry cash money with the user, and when a relatively large amount of cash money is needed, things may not be quite convenient in use.

To overcome the shortcoming of the conventional cash payment in convenience, currently many supermarket merchants have installed a point of sale (POS) terminal. A supermarket merchant can agree with a bank on a settlement, for example, a per-order settlement (that is, settling according to a transaction amount of each order), or a monthly settlement (that is, settling according to a total transaction amount in each month). After shopping in a supermarket, a user may pay on the POS terminal by using an account such as a bank card. The user may swipe an account medium of the user such as the bank card on the POS terminal, the POS terminal may read card number information, and send the card number information and purchase information (including information such as a total price of purchased articles, a merchant name, and a merchant identifier) to a backend server. The backend server may instruct the bank to deduct corresponding money, so that electronic resources (that is, electronic money) in the account of the bank card of the user are transferred. Further, the supermarket merchant can obtain the corresponding cash money or electronic resources from the bank according to the transfer processing record on the backend server for the POS, based on the settlement agreed with the bank. For this manner, although convenience is improved to some extent, a user may need to carry an account medium such as a bank card with the user, and the account medium may be lost or stolen, consequently affecting security of a process of transfer processing of electronic resources in an account.

SUMMARY

According to example embodiments, there is provided an electronic resource processing method including sending, by a first terminal, an electronic resource transfer attribute to a second terminal, generating, by the second terminal, an electronic resource transfer request, based on the electronic resource transfer attribute and an encryption identifier for performing electronic resource transfer processing, and sending, by the second terminal, the electronic resource transfer request to a server. The method further includes querying, by the server, an associated account of the second terminal, based on the encryption identifier, performing, by the server, transfer processing on electronic resources in the associated account of the second terminal, based on the electronic resource transfer attribute, and notifying, by the server, the first terminal and the second terminal of a result of the transfer processing.

According to example embodiments, there is provided an electronic resource processing method including receiving, by a server, an electronic resource transfer request from a second terminal, the electronic resource transfer request being generated by the second terminal, based on an encryption identifier for performing electronic resource transfer processing and an electronic resource transfer attribute that is received from a first terminal. The method further includes querying, by the server, an associated account of the second terminal, based on the encryption identifier, performing, by the server, transfer processing on electronic resources in the associated account of the second terminal, based on the electronic resource transfer attribute, and notifying, by the server, the first terminal and the second terminal of a result of the transfer processing.

According to example embodiments, there is provided a device including a memory configured to store instructions, and a processor configured to execute the instructions to receive an electronic resource transfer request from a second terminal, the electronic resource transfer request being generated by the second terminal, based on an encryption identifier for performing electronic resource transfer processing and an electronic resource transfer attribute that is received from a first terminal. The processor is further configured to execute the instructions to query an associated account of the second terminal, based on the encryption identifier, perform transfer processing on electronic resources in the associated account of the second terminal, based on the electronic resource transfer attribute, and notify the first terminal and the second terminal of a result of transfer processing.

DETAILED DESCRIPTION OF EXAMPLE EMBODIMENTS

In example embodiments, electronic resources may refer to electronic money in an electronic account. The electronic account may include, but is not limited to, a bank account, an electronic financial account, or a credit account.

Figure 1:
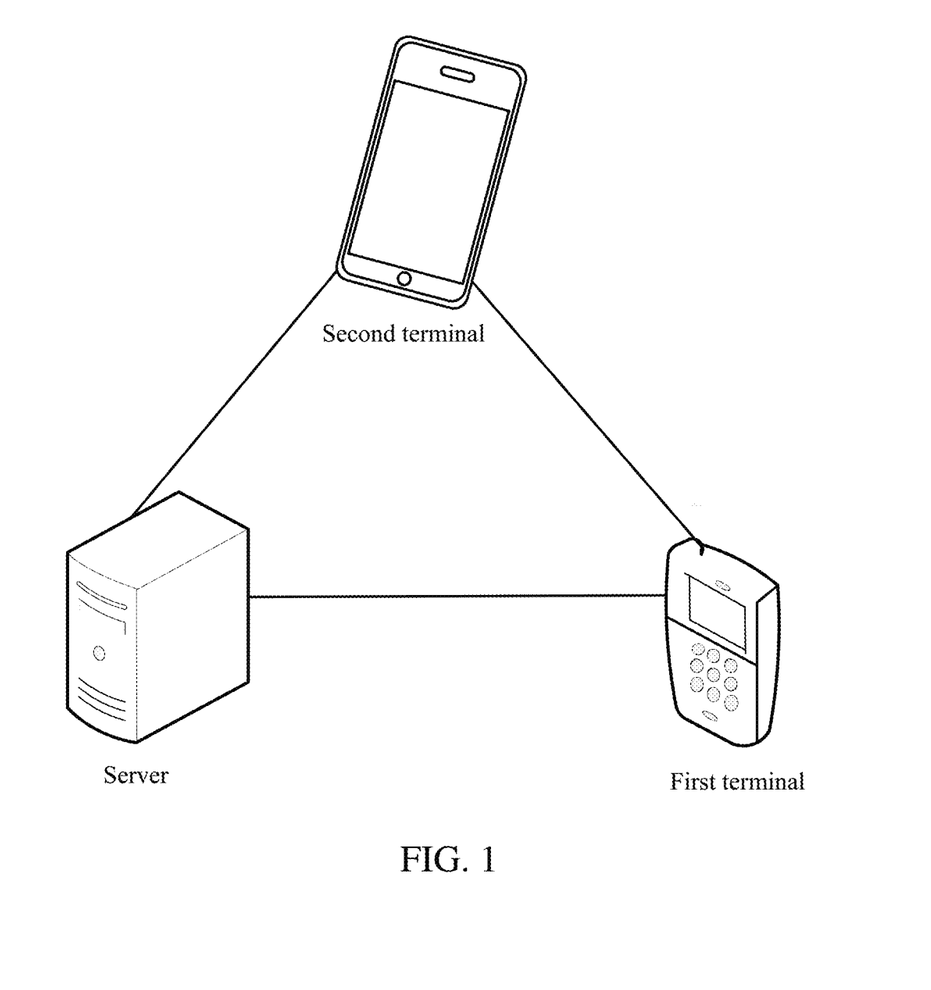
FIG. 1 is a schematic structural diagram of an electronic resource processing system according to example embodiments.

FIG. 1 is a schematic structural diagram of an electronic resource processing system according to example embodiments. The system may include a server, a first terminal, and a second terminal. The first terminal may be terminal device such as a POS. The second terminal may be an intelligent terminal such as a laptop computer, a mobile phone, a pad (tablet computer), or a smart wearable device.

A short-distance wireless communication connection such as near field communication (NFC) or Bluetooth may be established between the first terminal and the second terminal. The first terminal may establish a communication connection to the server to be in an online state, and the second terminal may also establish a communication connection to the server to be in an online state. Further, the first terminal may establish a communication connection to the server in a wired manner. For example, the first terminal may establish a communication connection to the server by using an optical fiber or a cable. The first terminal may also establish a communication connection to the server in a wireless manner. For example, the first terminal may establish a communication connection to the server by using Wireless Fidelity (WiFi), or a second/third/fourth generation wireless telephone technology (2G/3G/4G). Similarly, the second terminal may also establish a communication connection to the server in a wired manner such as an optical fiber or a cable, or the second terminal may establish a communication connection to the server in a wireless manner such as WiFi or 2G/3G/4G.

In the system described in the example embodiments, the first terminal may send an electronic resource transfer attribute to the second terminal; the second terminal may generate an electronic resource transfer request according to the electronic resource transfer attribute and an encryption identifier for performing electronic resource transfer processing, and send the electronic resource transfer request to the server; the server may query an associated account of the second terminal according to the encryption identifier, and perform transfer processing on electronic resources in the associated account of the second terminal according to the electronic resource transfer attribute; and the server may notify the first terminal and the second terminal of a transfer processing result. The electronic resource transfer processing may be implemented by interaction among the first terminal, the second terminal, and the server, without the need to manually carry cash money or an account medium for transfer, thereby improving convenience of the electronic resource transfer processing process, and improving security of the electronic resource transfer processing process.

The example embodiments may be applied to an offline shopping scenario. For example, when a user on the second terminal side pays after shopping in a supermarket, transfer processing may be performed on electronic resources (that is, electronic money of an equal value to a purchased article) in the associated account of the second terminal, that is, removing the electronic resources from the associated account of the second terminal, and the electronic resources removed from the associated account of the second terminal may further be transferred to an associated account of a supermarket merchant. In another example, when the user on the second terminal side directly purchases an article at a POS terminal by using the second terminal, transfer processing may need to be performed on electronic resources (that is, electronic money of an equal value to the article to be purchased) in the associated account of the second terminal, that is, removing the electronic resources from the associated account of the second terminal, the electronic resources removed from the associated account of the second terminal may further be transferred to an associated account of the POS terminal, and the article to be purchased may be sold at the POS terminal after the transfer processing succeeds.

Based on the foregoing description, an interaction procedure among the devices in the system shown in FIG. 1 is explained in detail below with reference to FIG. 2 to FIG. 4, to describe the electronic resource processing method provided in the example embodiments in detail.

Figure 2:
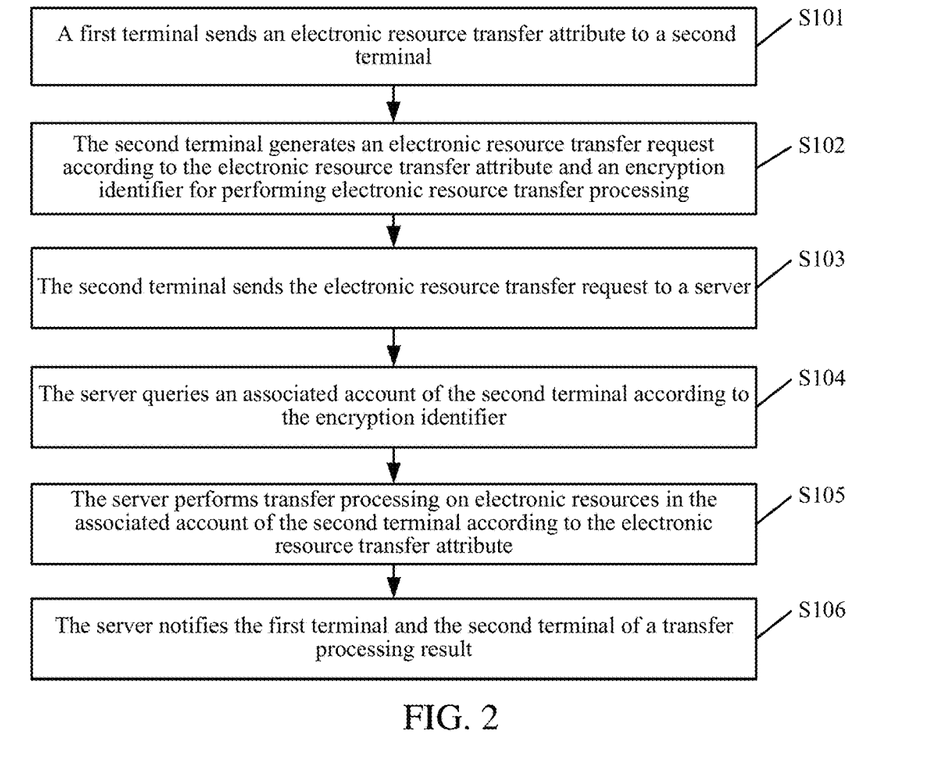
FIG. 2 is a flowchart of an electronic resource processing method according to example embodiments.

FIG. 2 is a flowchart of an electronic resource processing method according to example embodiments. A procedure of the electronic resource processing method is explained in this example embodiment from interaction among a first terminal, a second terminal, and a server. The method may include the following step S101 to step S106.

in step S101, a first terminal sends an electronic resource transfer attribute to a second terminal.

The electronic resource transfer attribute may define a flow direction of electronic resources in a transfer processing process and a quantity of electronic resources to be transferred. The electronic resource transfer attribute may include, but is not limited to, information about a receiver, and a quantity of electronic resources to be transferred. The receiver may refer to a merchant to which the first terminal belongs, and the information about the receiver may include, but is not limited to, information such as a name, an address, an identifier, and an associated account of the merchant to which the first terminal belongs. In an offline shopping scenario, the quantity of electronic resources to be transferred may be an amount of money of an equal value to a purchased article. In this example embodiment, the first terminal and the second terminal may communicate in a short-distance wireless communication manner such as NFC or Bluetooth. The first terminal may send the electronic resource transfer attribute to the second terminal, based on a short-distance wireless communication connection between the first terminal and the second terminal.

In step S102, the second terminal generates an electronic resource transfer request according to the electronic resource transfer attribute and an encryption identifier for performing electronic resource transfer processing.

The encryption identifier for performing electronic resource transfer processing may be obtained by performing encryption processing on a target identifier for performing electronic resource transfer processing. The target identifier may be associated with an associated account of the second terminal, and the associated account of the second terminal can be found by using the target identifier. The target identifier may include, but is not limited to, a device identifier of the second terminal, an identifier of a user on the second terminal side, or an identifier of the associated account of the second terminal. The device identifier of the second terminal may include, but is not limited to, any one or combination of the following: model information of the second terminal, read-only memory (ROM) information of the second terminal, manufacturer information of the second terminal, or kernel information of the second terminal. The user on the second terminal side refers to a user using the second terminal, and the identifier of the user on the second terminal side may include, but is not limited to, any one or combination of the following: an instant messaging number, a phone number, an email, or an identity (ID) of the user on the second terminal side. The associated account of the second terminal may include, but is not limited to, any one or combination of the following: a bank account, an electronic financial account, or a credit account. The second terminal may encapsulate the electronic resource transfer attribute and the encryption identifier according to a communications protocol between the second terminal and the server, to generate the electronic resource transfer request.

In step S103, the second terminal sends the electronic resource transfer request to a server.

In this example embodiment, the second terminal may establish a communication connection to the server to be in an online state, and the second terminal may send the electronic resource transfer request to the server, based on the communication connection to the server.

In step S104, the server queries an associated account of the second terminal according to the encryption identifier.

The server may parse the received electronic resource transfer request, based on the communications protocol between the server and the second terminal, to obtain the encryption identifier and the electronic resource transfer attribute. Because the encryption identifier is obtained by performing encryption processing on the target identifier for performing electronic resource transfer processing, the server may decrypt the encryption identifier to obtain the target identifier, and can find the associated account of the second terminal by using the target identifier.

In step S105, the server performs transfer processing on electronic resources in the associated account of the second terminal according to the electronic resource transfer attribute.

The electronic resource transfer attribute may define the flow direction of the electronic resources in the transfer processing process and the quantity of electronic resources to be transferred. In this step, the server may remove, from the associated account of the second terminal according to the definition of the electronic resource transfer attribute, the quantity of electronic resources to be transferred, and may further transfer the removed quantity of electronic resources to the receiver.

In step S106, the server notifies the first terminal and the second terminal of a transfer processing result.

The transfer processing result may include a transfer processing success or a transfer processing failure. During an implementation, the server may determine the transfer processing result according to a settlement of the merchant to which the first terminal belongs. The settlement may include, but is not limited to, a real-time settlement or a non-real-time settlement. The real-time settlement may include a per-order settlement, which refers to settling according to a transaction amount of each order. The non-real-time settlement may include, but is not limited to, a weekly settlement (that is, settling according to a total transaction amount in each week), or a monthly settlement (that is, settling according to a total transaction amount in each month). If the settlement of the merchant to which the first terminal belongs is the real-time settlement, and if the electronic resources in the associated account of the second terminal are successfully transferred to the receiver, the transfer processing succeeds; otherwise, the electronic resource transfer processing fails. If the settlement of the merchant to which the first terminal belongs is the non-real-time settlement, and if the electronic resources in the associated account of the second terminal are successfully removed from the associated account of the second terminal, the transfer processing succeeds; otherwise, the transfer processing fails.

Further, if the transfer processing result is the transfer processing failure, the server may further carry a cause of failure in the transfer processing result. The cause of failure may include, but is not limited to, that the associated account of the second terminal is an invalid account, that a total quantity of electronic resources in the associated account of the second terminal is not sufficient, and that the associated account of the second terminal cannot be connected to due to a network cause. In this example embodiment, the first terminal may also establish a communication connection to the server to be in an online state. The server may separately establish a communication connection to the first terminal and the second terminal, and separately notify the first terminal and the second terminal of the transfer processing result based on the established communication connection.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

Figure 3:
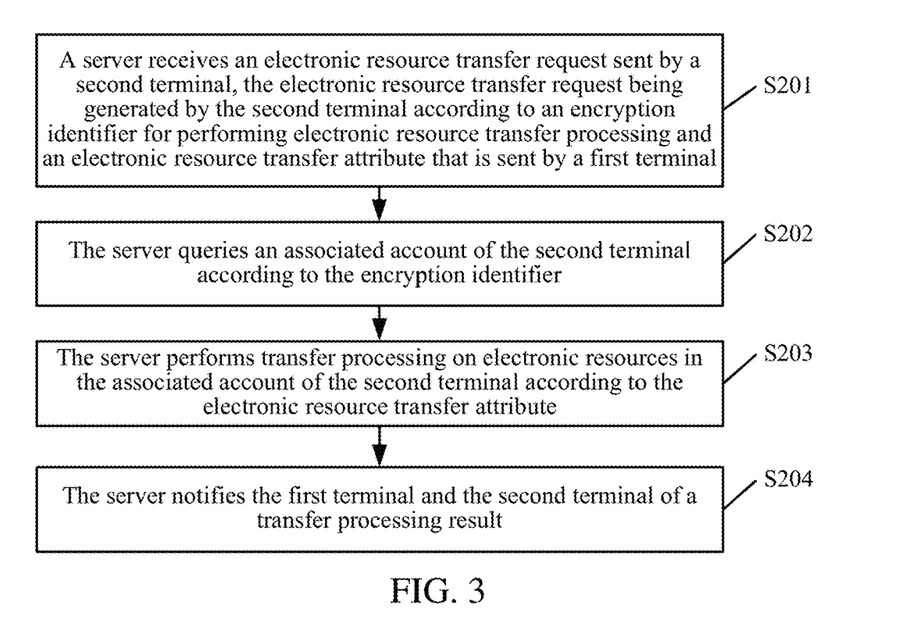
FIG. 3 is a flowchart of another electronic resource processing method according to example embodiments.

FIG. 3 is a flowchart of another electronic resource processing method according to example embodiments. The procedure of electronic resource transfer processing is explained in this example embodiment from a server side. The method may include the following step S201 to step S204.

in step S201, a server receives an electronic resource transfer request sent by a second terminal, the electronic resource transfer request being generated by the second terminal according to an encryption identifier for performing electronic resource transfer processing and an electronic resource transfer attribute that is sent by a first terminal.

In this example embodiment, the second terminal may establish a communication connection to the server to be in an online state, and the server may receive, based on the communication connection to the second terminal, the electronic resource transfer request sent by the second terminal. The electronic resource transfer attribute may define a flow direction of electronic resources in a transfer processing process and a quantity of electronic resources to be transferred. The electronic resource transfer attribute may include, but is not limited to, information about a receiver, and a quantity of electronic resources to be transferred. The receiver may refer to a merchant to which the first terminal belongs, and the information about the receiver may include, but is not limited to, information such as a name, an address, an identifier, and an associated account of the merchant to which the first terminal belongs. In an offline shopping scenario, the quantity of electronic resources to be transferred may be an amount of money of an equal value to a purchased article. The encryption identifier for performing electronic resource transfer processing may be obtained by performing encryption processing on a target identifier for performing electronic resource transfer processing. The target identifier may be associated with an associated account of the second terminal, and the associated account of the second terminal can be found by using the target identifier. The target identifier may include, but is not limited to, a device identifier of the second terminal, an identifier of a user on the second terminal side, or an identifier of the associated account of the second terminal.

In step S202, the server queries an associated account of the second terminal according to the encryption identifier.

The server may parse the received electronic resource transfer request, based on a communications protocol between the server and the second terminal, to obtain the encryption identifier and the electronic resource transfer attribute. Because the encryption identifier is obtained by performing encryption processing on the target identifier for performing electronic resource transfer processing, the server may decrypt the encryption identifier to obtain the target identifier, and can find the associated account of the second terminal by using the target identifier.

In step S203, the server performs transfer processing on electronic resources in the associated account of the second terminal according to the electronic resource transfer attribute.

The electronic resource transfer attribute may define the flow direction of the electronic resources in the transfer processing process and the quantity of electronic resources to be transferred. In this step, the server may remove, from the associated account of the second terminal according to the definition of the electronic resource transfer attribute, the quantity of electronic resources to be transferred, and may further transfer the removed quantity of electronic resources to the receiver.

In step S204, the server notifies the first terminal and the second terminal of a transfer processing result.

The transfer processing result may include a transfer processing success or a transfer processing failure. During an implementation, the server may determine the transfer processing result according to a settlement of the merchant to which the first terminal belongs. The settlement may include, but is not limited to, a real-time settlement or a non-real-time settlement. The real-time settlement may include a per-order settlement, which refers to settling according to a transaction amount of each order. The non-real-time settlement may include, but is not limited to, a weekly settlement (that is, settling according to a total transaction amount in each week), or a monthly settlement (that is, settling according to a total transaction amount in each month). If the settlement of the merchant to which the first terminal belongs is the real-time settlement, and if the electronic resources in the associated account of the second terminal are successfully transferred to the receiver, the transfer processing succeeds; otherwise, the electronic resource transfer processing fails. If the settlement of the merchant to which the first terminal belongs is the non-real-time settlement, and if the electronic resources in the associated account of the second terminal are successfully removed from the associated account of the second terminal, the transfer processing succeeds; otherwise, the transfer processing fails.

Further, if the transfer processing result is the transfer processing failure, the server may further carry a cause of failure in the transfer processing result. The cause of failure may include, but is not limited to, that the associated account of the second terminal is an invalid account, that a total quantity of electronic resources in the associated account of the second terminal is not sufficient, that the associated account of the second terminal cannot be connected to due to a network cause. In this example embodiment, the first terminal may also establish a communication connection to the server to be in an online state. The server may separately establish a communication connection to the first terminal and the second terminal, and separately notify the first terminal and the second terminal of the transfer processing result based on the established communication connection.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

Figure 4:
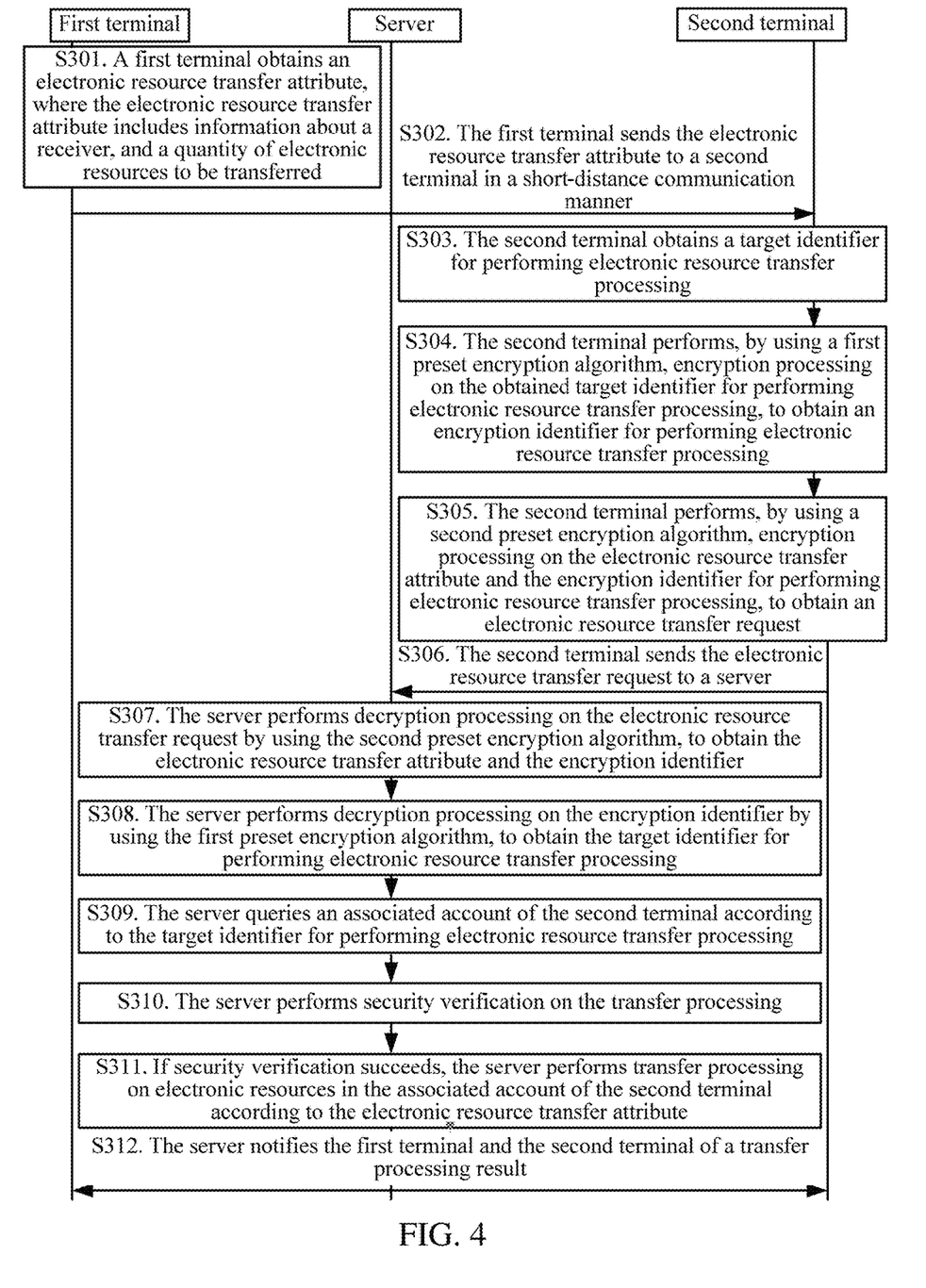
FIG. 4 is a flowchart of still another electronic resource processing method according to example embodiments.

FIG. 4 is a flowchart of still another electronic resource processing method according to example embodiments. The procedure of electronic resource transfer processing is explained in this example embodiment from interaction among a first terminal, a second terminal, and a server. The method may include the following step S301 to step S312.

in step S301, the first terminal obtains an electronic resource transfer attribute, where the electronic resource transfer attribute includes information about a receiver, and a quantity of electronic resources to be transferred.

In an offline shopping scenario, the first terminal may generate the electronic resource transfer attribute according to information such as an article purchased by a user on the second terminal side and a merchant to which the first terminal belongs to. The electronic resource transfer attribute may define a flow direction of electronic resources in a transfer processing process and a quantity of electronic resources to be transferred. The electronic resource transfer attribute may include, but is not limited to, information about a receiver, and a quantity of electronic resources to be transferred. The receiver may refer to the merchant to which the first terminal belongs, and the information about the receiver may include, but is not limited to, information such as a name, an address, an identifier, and an associated account of the merchant to which the first terminal belongs. In an offline shopping scenario, the quantity of electronic resources to be transferred may be an amount of money of an equal value to the purchased article.

In step S302, the first terminal sends the electronic resource transfer attribute to a second terminal in a short-distance communication manner, which includes an NFC manner or a Bluetooth manner.

The first terminal may establish a short-distance wireless communication connection to the second terminal. For example, the first terminal and the second terminal may be both configured with an NFC communication module, and the NFC communication module of the first terminal and the NFC communication module of the second terminal may establish an NFC communication connection. In another example, the first terminal and the second terminal may be both configured with a Bluetooth communication module, and the Bluetooth communication module of the first terminal and the Bluetooth communication module of the second terminal may perform Bluetooth pairing, and establish a Bluetooth communication connection. The first terminal may send the electronic resource transfer attribute to the second terminal, based on the short-distance wireless communication connection such as NFC or Bluetooth to the second terminal. It may be noted that, this example embodiment may be applied to an offline shopping scenario, and the first terminal and the second terminal may communicate in a short-distance wireless communication manner, enabling communication to be more accurate and rapid, thereby improving effectiveness of communication and interaction.

The foregoing step S301 to step S302 in this example embodiment may be detailed steps of step S101 in the example embodiment shown in FIG. 2.

In step S303, the second terminal obtains a target identifier for performing electronic resource transfer processing, and the target identifier may include a device identifier of the second terminal, an identifier of a user on the second terminal side, or an identifier of an associated account of the second terminal.

The target identifier may be associated with the associated account of the second terminal, and the associated account of the second terminal can be found by using the target identifier. The device identifier of the second terminal may include, but is not limited to, any one or more of model information of the second terminal, ROM information of the second terminal, manufacturer information of the second terminal, or kernel information of the second terminal. The user on the second terminal side refers to a user using the second terminal, and the identifier of the user on the second terminal side may include, but is not limited to, any one or more of an instant messaging number, a phone number, an email, or an ID of the user on the second terminal side. The associated account of the second terminal may include, but is not limited to, any one or more of a bank account, an electronic financial account, or a credit account.

During an implementation, the second terminal may read the device identifier of the second terminal from an operating system of the second terminal, the second terminal may read the identifier of the user on the second terminal side when the user on the second terminal side uses the second terminal, the second terminal may obtain an identifier of an associated account that is bound to the identifier of the user on the second terminal side in advance, or the second terminal may require the user on the second terminal side to input the identifier of the associated account of the second terminal.

In step S304, the second terminal performs, by using a first preset encryption algorithm, encryption processing on the obtained target identifier for performing electronic resource transfer processing, to obtain an encryption identifier for performing electronic resource transfer processing.

The first preset encryption algorithm may include, but is not limited to, a Hash algorithm, a digest algorithm, a symmetrical encryption algorithm, or an asymmetrical encryption algorithm. The second terminal may perform encryption processing on the target identifier by using the first preset encryption algorithm. This can improve security of the target identifier in a transmission process.

In step S305, the second terminal performs, by using a second preset encryption algorithm, encryption processing on the electronic resource transfer attribute and the encryption identifier for performing electronic resource transfer processing, to obtain an electronic resource transfer request.

The second preset encryption algorithm may include, but is not limited to, a Hash algorithm, a digest algorithm, a symmetrical encryption algorithm, or an asymmetrical encryption algorithm. The second terminal may perform encryption processing on the electronic resource transfer attribute and the encryption identifier, according to a communications protocol between the second terminal and a server, by using the second preset encryption algorithm, to obtain the electronic resource transfer request. This can improve security and reliability of the electronic resource transfer request in a transmission process.

The foregoing step S303 to step S305 in this example embodiment may be detailed steps of step S102 in the example embodiment shown in FIG. 2.

In step S306, the second terminal sends the electronic resource transfer request to a server.

In this example embodiment, the second terminal may establish a communication connection to the server to be in an online state, and the second terminal may send the electronic resource transfer request to the server based on the communication connection to the server.

In step S307, the server performs decryption processing on the electronic resource transfer request by using the second preset encryption algorithm, to obtain the electronic resource transfer attribute and the encryption identifier.

The server may parse the received electronic resource transfer request, based on a communications protocol between the server and the second terminal by using the second preset encryption algorithm, to obtain the encryption identifier and the electronic resource transfer attribute.

In step S308, the server performs decryption processing on the encryption identifier by using the first preset encryption algorithm, to obtain the target identifier for performing electronic resource transfer processing. The target identifier may be associated with the associated account of the second terminal, and the associated account of the second terminal can be found by using the target identifier.

In step S309, the server queries an associated account of the second terminal according to the target identifier for performing electronic resource transfer processing.

The foregoing step S307 to step S309 in this example embodiment may be detailed steps of step S104 in the example embodiment shown in FIG. 2.

In step S310, the server performs security verification on the transfer processing, and if security verification succeeds, proceeds to step S311.

In this step, a purpose of performing security verification on the transfer processing is to confirm security of the electronic resources in the transfer processing process, to ensure security of the associated account of the second terminal, and therefore to protect interests of the user on the second terminal side. During an implementation, this step may include the following step s11 to step s14.

In step s11, the server may obtain a score of at least one risk factor of the transfer processing.

The risk factor may include any one or any combination of the following: the quantity of electronic resources to be transferred exceeds a preset quantity threshold, the device identifier of the second terminal is not a preset frequently-used device identifier, a geographic location at which the second terminal is located is not a preset frequently-used place, a data receiver is a preset high-risk user, or a request time of the electronic resource transfer request is a preset high-risk transaction time.

The preset quantity threshold may be set according to an actual requirement. For example, the preset quantity threshold may be set according to a multiple of an average of quantities of electronic resources transferred in multiple historical transfer processing processes. For example, the preset quantity threshold may be set to one time, five times, or ten times of an average of electronic resources transferred in previous N times. The preset frequently-used device identifier may be a device identifier that is configured by the user on the second terminal side in advance, or may be a device identifier, obtained by statistics collection, which is used in multiple historical transfer processing processes related to the associated account of the second terminal. The preset frequently-used place may be a geographical location that is configured by the user on the second terminal side in advance, or may be a geographical location, obtained by statistics collection, which is used in multiple historical transfer processing processes related to the associated account of the second terminal. The preset high-risk user may be a merchant that may perform malicious transfer processing and that is obtained by the server by statistics collection according to experience. The preset high-risk transaction time may be a time range in which a malicious transfer processing process frequently occurs that is obtained by the server by statistics collection according to experience.

In this example embodiment, the server may set a corresponding weight score for each risk factor in advance. For example, if the quantity of electronic resources to be transferred exceeds the preset quantity threshold, a weight score of 5 points may be obtained. If the device identifier of the second terminal is not the preset frequently-used device identifier, a weight score of 5 points may be obtained. If the geographic location at which the second terminal is located is not the preset frequently-used place, a weight score of 3 points may be obtained. If the data receiver is the preset high-risk user, a weight score of 3 points may be obtained. If the request time of the electronic resource transfer request is the preset high-risk transaction time, a weight score of 4 points may be obtained.

In step s12, the server may calculate an aggregate score of the at least one risk factor.

The server may calculate a total weight score of all the risk factors, according to the weight score obtained by each risk factor. For example, according to the example in step s11, the server may calculate the aggregate score of all the risk factors as 5+5+3+3+4=20.

In step s13, the server may determine that security verification succeeds if the aggregate score of the at least one risk factor is less than or equal to a preset score threshold.

In step s14, the server may send a security alert to the second terminal if the aggregate score of the at least one risk factor is greater than the preset score threshold, and determine that security verification succeeds after receiving a confirmation message fed back by the second terminal.

In steps s13 to s14, the preset score threshold may be set according to experience. The preset score threshold may be set according to a requirement on security. A lower preset score threshold may indicate a higher requirement on security. Otherwise, a higher preset score threshold may indicate a lower requirement on security. For example, the preset score threshold may be set to 25 points, or the preset score threshold may be set to 15 points. If the aggregate score of the at least one risk factor is less than or equal to the preset score threshold, security verification may succeed, and a subsequent transfer processing process may be performed. If the aggregate score of the at least one risk factor is greater than the preset score threshold, it may indicate that there may be a security risk in the current transfer processing process, and the server may send the security alert to the second terminal. The security alert may be used to prompt the user to input an account password or input a security verification code. After receiving the confirmation message fed back by the second terminal, the server may then determine that security verification succeeds, and the subsequent transfer processing process may be performed. The confirmation message may carry a correct account password or a correct security verification code. It may be noted that, if the confirmation message is not fed back, or the fed back confirmation message carries an incorrect account password or an incorrect security verification code, the server may determine that there is a security risk in the current transfer processing process, and therefore end the procedure. The current transfer processing process may no longer be continued. That is, the transfer processing may fail.

In step S311, the server performs transfer processing on electronic resources in the associated account of the second terminal according to the electronic resource transfer attribute.

The electronic resource transfer attribute may define the flow direction of the electronic resources in the transfer processing process and the quantity of electronic resources to be transferred. In this step, the server may remove, from the associated account of the second terminal, according to the definition of the electronic resource transfer attribute, the quantity of electronic resources to be transferred, and may further transfer the removed quantity of electronic resources to the receiver.

In step S312, the server notifies the first terminal and the second terminal of a transfer processing result.

The transfer processing result may include a transfer processing success or a transfer processing failure. During an implementation, the server may determine the transfer processing result according to a settlement of the merchant to which the first terminal belongs. The settlement may include, but is not limited to, a real-time settlement or a non-real-time settlement. The real-time settlement may include a per-order settlement, which refers to settling according to a transaction amount of each order. The non-real-time settlement may include, but is not limited to, a weekly settlement (that is, settling according to a total transaction amount in each week), or a monthly settlement (that is, settling according to a total transaction amount in each month). If the settlement of the merchant to which the first terminal belongs is the real-time settlement, and if the electronic resources in the associated account of the second terminal are successfully transferred to the receiver, the transfer processing succeeds; otherwise, the electronic resource transfer processing fails. If the settlement of the merchant to which the first terminal belongs is the non-real-time settlement, and if the electronic resources in the associated account of the second terminal are successfully removed from the associated account of the second terminal, the transfer processing succeeds; otherwise, the transfer processing fails.

Further, if the transfer processing result is the transfer processing failure, the server may further carry a cause of failure in the transfer processing result. The cause of failure may include, but is not limited to, that the associated account of the second terminal is an invalid account, that a total quantity of electronic resources in the associated account of the second terminal is not sufficient, that the associated account of the second terminal cannot be connected to due to a network cause. In this example embodiment, the first terminal may also establish a communication connection to the server to be in an online state. The server may separately establish a communication connection to the first terminal and the second terminal, and separately notify the first terminal and the second terminal of the transfer processing result, based on the established communication connection.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

The structure and function of the electronic resource processing apparatus provided in the example embodiments are described in detail below with reference to FIG. 5 to FIG. 7. It may be noted that the following apparatus may run in the server in the system shown in FIG. 1, to be applied to the methods shown in FIG. 2 to FIG. 4 above.

Figure 5:
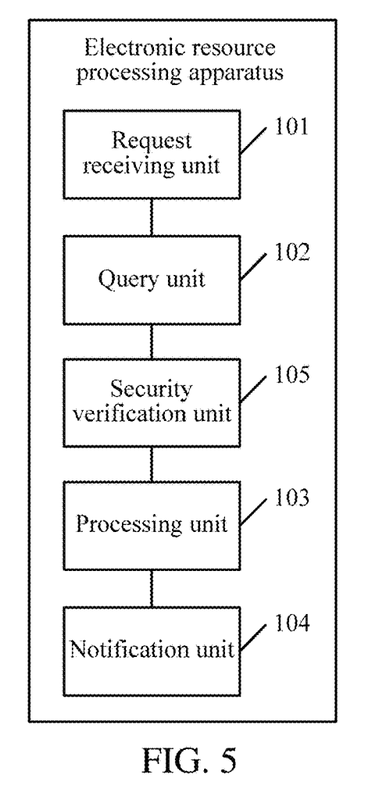
FIG. 5 is a schematic structural diagram of an electronic resource processing apparatus according to example embodiments.

FIG. 5 is a schematic structural diagram of an electronic resource processing apparatus according to example embodiments. The apparatus includes a request receiving unit 101, a query unit 102, a processing unit 103, and a notification unit 104.

The request receiving unit 101 is configured to receive an electronic resource transfer request sent by a second terminal, the electronic resource transfer request being generated by the second terminal according to an encryption identifier for performing electronic resource transfer processing and an electronic resource transfer attribute that is sent by a first terminal.

In this example embodiment, the second terminal may establish a communication connection to a server to be in an online state, and the request receiving unit 101 may receive, based on the communication connection to the second terminal, the electronic resource transfer request sent by the second terminal. The electronic resource transfer attribute may define a flow direction of electronic resources in a transfer processing process and a quantity of electronic resources to be transferred. The electronic resource transfer attribute may include, but is not limited to, information about a receiver, and a quantity of electronic resources to be transferred. The receiver may refer to a merchant to which the first terminal belongs, and the information about the receiver may include, but is not limited to, information such as a name, an address, an identifier, and an associated account of the merchant to which the first terminal belongs. In an offline shopping scenario, the quantity of electronic resources to be transferred may be an amount of money of an equal value to a purchased article. The encryption identifier for performing electronic resource transfer processing may be obtained by performing encryption processing on a target identifier for performing electronic resource transfer processing. The target identifier may be associated with the associated account of the second terminal, and the associated account of the second terminal can be found by using the target identifier. The target identifier may include, but is not limited to, a device identifier of the second terminal, an identifier of a user on the second terminal side, or an identifier of the associated account of the second terminal.

The query unit 102 is configured to query an associated account of the second terminal, according to the encryption identifier.

The query unit 102 may parse the received electronic resource transfer request based on a communications protocol between the server and the second terminal, to obtain the encryption identifier and the electronic resource transfer attribute. Because the encryption identifier may be obtained by performing encryption processing on the target identifier for performing electronic resource transfer processing, the query unit 102 may decrypt the encryption identifier to obtain the target identifier, and can find the associated account of the second terminal by using the target identifier.

The processing unit 103 is configured to perform transfer processing on electronic resources in the associated account of the second terminal, according to the electronic resource transfer attribute.

The electronic resource transfer attribute may define the flow direction of the electronic resources in the transfer processing process and the quantity of electronic resources to be transferred. The processing unit 103 may remove, from the associated account of the second terminal, according to the definition of the electronic resource transfer attribute, the quantity of electronic resources to be transferred, and may further transfer the removed quantity of electronic resources to the receiver.

The notification unit 104 is configured to notify the first terminal and the second terminal of a transfer processing result.

The transfer processing result may include a transfer processing success or a transfer processing failure. During an implementation, the server may determine the transfer processing result, according to a settlement of the merchant to which the first terminal belongs. The settlement may include, but is not limited to, a real-time settlement or a non-real-time settlement. The real-time settlement may include a per-order settlement, which refers to settling according to a transaction amount of each order. The non-real-time settlement may include, but is not limited to, a weekly settlement (that is, settling according to a total transaction amount in each week), or a monthly settlement (that is, settling according to a total transaction amount in each month). If the settlement of the merchant to which the first terminal belongs is the real-time settlement, and if the electronic resources in the associated account of the second terminal are successfully transferred to the receiver, the transfer processing succeeds; otherwise, the electronic resource transfer processing fails. If the settlement of the merchant to which the first terminal belongs is the non-real-time settlement, and if the electronic resources in the associated account of the second terminal are successfully removed from the associated account of the second terminal, the transfer processing succeeds; otherwise, the transfer processing fails.

Further, if the transfer processing result is the transfer processing failure, the notification unit 104 may further carry a cause of failure in the transfer processing result. The cause of failure may include, but is not limited to, that the associated account of the second terminal is an invalid account, that a total quantity of electronic resources in the associated account of the second terminal is not sufficient, that the associated account of the second terminal cannot be connected to due to a network cause. In this example embodiment, the first terminal may also establish a communication connection to the server to be in an online state. The server may separately establish a communication connection to the first terminal and the second terminal, and the notification unit 104 may separately notify the first terminal and the second terminal of the transfer processing result, based on the established communication connection.

Referring to FIG. 5 again, optionally, the apparatus may further include a security verification unit 105.

The security verification unit 105 is configured to perform security verification on the transfer processing, and the processing unit 103 is configured to perform transfer processing on the electronic resources in the associated account of the second terminal, according to the electronic resource transfer attribute after security verification succeeds.

A purpose of performing security verification on the transfer processing is to confirm security of the electronic resources in the transfer processing process, to ensure security of the associated account of the second terminal, and therefore to protect interests of the user on the second terminal side.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal, according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

Figure 6:
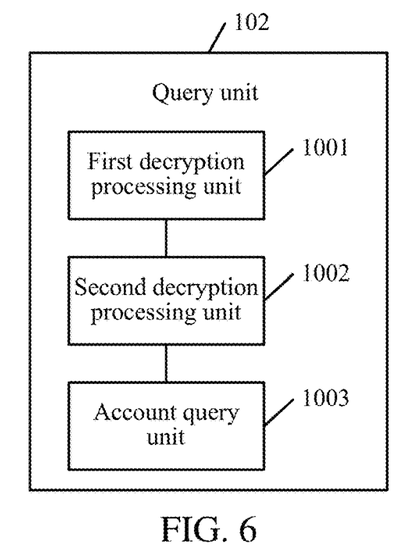
FIG. 6 is a schematic structural diagram of a query unit shown in FIG. 5.

FIG. 6 is a schematic structural diagram of the query unit 102 shown in FIG. 5. The query unit 102 includes a first decryption processing unit 1001, a second decryption processing unit 1002, and an account query unit 1003.

The first decryption processing unit 1001 is configured to perform decryption processing on the electronic resource transfer request by using a second preset encryption algorithm, to obtain the electronic resource transfer attribute and the encryption identifier.

The second preset encryption algorithm may include, but is not limited to, a Hash algorithm, a digest algorithm, a symmetrical encryption algorithm, or an asymmetrical encryption algorithm. The second terminal may perform encryption processing on the electronic resource transfer attribute and the encryption identifier, according to a communications protocol between the second terminal and the server by using the second preset encryption algorithm, to obtain the electronic resource transfer request. This can improve security and reliability of the electronic resource transfer request in a transmission process. The first decryption processing unit 1001 may parse the received electronic resource transfer request, based on the communications protocol between the server and the second terminal by using the second preset encryption algorithm, to obtain the encryption identifier and the electronic resource transfer attribute.

The second decryption processing unit 1002 is configured to perform decryption processing on the encryption identifier by using the first preset encryption algorithm, to obtain the target identifier for performing electronic resource transfer processing.

The first preset encryption algorithm may include, but is not limited to, a Hash algorithm, a digest algorithm, a symmetrical encryption algorithm, or an asymmetrical encryption algorithm. The second terminal performs encryption processing on the target identifier by using the first preset encryption algorithm, to obtain the encryption identifier for performing electronic resource processing. This can improve security of the target identifier in a transmission process. The second decryption processing unit 1002 may perform decryption processing on the encryption identifier by using the first preset encryption algorithm, to obtain the target identifier for performing electronic resource transfer processing. The target identifier may be associated with the associated account of the second terminal, and the associated account of the second terminal can be found by using the target identifier.

The account query unit 1003 is configured to query the associated account of the second terminal, according to the target identifier for performing electronic resource transfer processing.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal, according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

Figure 7:
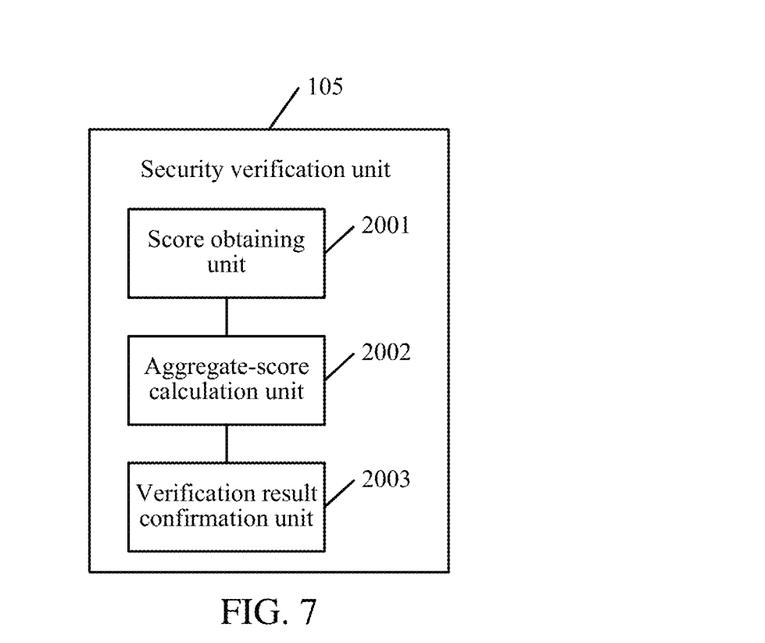
FIG. 7 is a schematic structural diagram of a security verification unit shown in FIG. 5.

FIG. 7 is a schematic structural diagram of the security verification unit 105 shown in FIG. 5. The security verification unit 105 includes a score obtaining unit 2001, an aggregate-score calculation unit 2002, and a verification result confirmation unit 2003.

The score obtaining unit 2001 is configured to obtain a score of at least one risk factor of the transfer processing.

The risk factor may include any one or any combination of the following: the quantity of electronic resources to be transferred exceeds a preset quantity threshold, the device identifier of the second terminal is not a preset frequently-used device identifier, a geographic location at which the second terminal is located is not a preset frequently-used place, a data receiver is a preset high-risk user, or a request time of the electronic resource transfer request is a preset high-risk transaction time.

The preset quantity threshold may be set according to an actual requirement. For example, the preset quantity threshold may be set according to a multiple of an average of quantities of electronic resources transferred in multiple historical transfer processing processes. For example, the preset quantity threshold may be set to one time, five times, or ten times of an average of electronic resources transferred in previous N times. The preset frequently-used device identifier may be a device identifier that is configured by the user on the second terminal side in advance, or may be a device identifier, obtained by statistics collection, which is used in multiple historical transfer processing processes related to the associated account of the second terminal. The preset frequently-used place may be a geographical location that is configured by the user on the second terminal side in advance, or may be a geographical location, obtained by statistics collection, which is used in multiple historical transfer processing processes related to the associated account of the second terminal. The preset high-risk user may be a merchant that may perform malicious transfer processing and that is obtained by the server by statistics collection, according to experience. The preset high-risk transaction time may be a time range in which a malicious transfer processing process frequently occurs that is obtained by the server by statistics collection, according to experience.

In this example embodiment, the server may set a corresponding weight score for each risk factor in advance. For example, if the quantity of electronic resources to be transferred exceeds the preset quantity threshold, the score obtaining unit 2001 may obtain a weight score of 5 points. If the device identifier of the second terminal is not the preset frequently-used device identifier, the score obtaining unit 2001 may obtain a weight score of 5 points. If the geographic location at which the second terminal is located is not the preset frequently-used place, the score obtaining unit 2001 may obtain a weight score of 3 points. If the data receiver is the preset high-risk user, the score obtaining unit 2001 may obtain a weight score of 3 points. If the request time of the electronic resource transfer request is the preset high-risk transaction time, the score obtaining unit 2001 may obtain a weight score of 4 points.

The aggregate-score calculation unit 2002 is configured to calculate an aggregate score of the at least one risk factor.

The aggregate-score calculation unit 2002 calculates a total weight score of all the risk factors, according to the weight score obtained by each risk factor. For example, according to the example in this example embodiment, the aggregate-score calculation unit 2002 may calculate the aggregate score of all the risk factors as 5+5+3+3+4=20.

The verification result confirmation unit 2003 is configured to determine that security verification succeeds if the aggregate score of the at least one risk factor is less than or equal to a preset score threshold; or configured to: send a security alert to the second terminal if the aggregate score of the at least one risk factor is greater than the preset score threshold, and determine that security verification succeeds after receiving a confirmation message fed back by the second terminal.

The preset score threshold may be set according to experience. The preset score threshold may be set according to a requirement on security. A lower preset score threshold may indicate a higher requirement on security. Otherwise, a higher preset score threshold may indicate a lower requirement on security. For example, the preset score threshold may be set to 25 points, or the preset score threshold may be set to 15 points. If the aggregate score of the at least one risk factor is less than or equal to the preset score threshold, security verification may succeed, and a subsequent transfer processing process may be performed. If the aggregate score of the at least one risk factor is greater than the preset score threshold, it may indicate that there may be a security risk in the current transfer processing process, and the verification result confirmation unit 2003 may send a security alert to the second terminal. The security alert may be used to prompt the user to input an account password or input a security verification code. After receiving the confirmation message fed back by the second terminal, the server may then determine that security verification succeeds and the subsequent transfer processing process may be performed. The confirmation message may carry a correct account password or a correct security verification code. It may be noted that, if the confirmation message is not fed back, or the fed back confirmation message carries an incorrect account password or an incorrect security verification code, the verification result confirmation unit 2003 may determine that there is a security risk in the current transfer processing process, and therefore end the current transfer processing process. That is, the transfer processing may fail.

In this example embodiment, an electronic resource transfer attribute may be exchanged between a first terminal and a second terminal, and the electronic resource transfer attribute and an encryption identifier for performing electronic resource transfer processing may be exchanged between the second terminal and a server. The server may query an associated account of the second terminal according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

An example embodiment further discloses a server. The server may be the server in the system shown in FIG. 1. The server may include an electronic resource processing apparatus. For a structure and a function of the apparatus, refer to the related descriptions in the example embodiments shown in FIG. 5 to FIG. 7, and details are not described herein again. The server in this example embodiment may be applied to the methods shown in FIG. 2 to FIG. 4.

In this example embodiment, an electronic resource transfer attribute may be exchanged between a first terminal and a second terminal, and the electronic resource transfer attribute and an encryption identifier for performing electronic resource transfer processing are exchanged between the second terminal and a server. The server may query an associated account of the second terminal according to the encryption identifier, perform transfer processing on electronic resources in the associated account of the second terminal according to the electronic resource transfer attribute, and finally notify the first terminal and the second terminal of a transfer processing result. The entire electronic resource transfer processing process may be implemented by interaction among the first terminal, the second terminal, and the server, without the need to manually carry cash money or an account medium for transfer, thereby improving convenience of the electronic resource transfer processing process, and improving security of the electronic resource transfer processing process.

A person of ordinary skill in the art can understand that the entire or partial procedure for implementing the method in example embodiments may be completed by calling a computer program to instruct relevant hardware. For example, the computer program may be stored in a computer readable storage medium. When called, the program may cause hardware (for example, a machine, a device, a computing device, a computer system, or hardware involved in a network) to perform the operations in the example embodiments of the foregoing methods. The computer readable storage medium may include, but is not limited to, a magnetic disk, an optical disc, a read-only memory (ROM), or a random access memory (RAM). In addition, the foregoing computer readable storage medium may also be a recording medium of various types that can be accessed by a computer device by using a network or by using a communications link, for example, a recording medium for which data therein can be extracted by using a router, the Internet, a local area network, or the like. In addition, the foregoing computer readable storage medium may refer to multiple computer readable storage media disposed in, for example, a same computer system, or may refer to computer readable storage media distributed in, for example, multiple computer systems or computing devices.

In addition, an example embodiment further provides a device.

Figure 8:
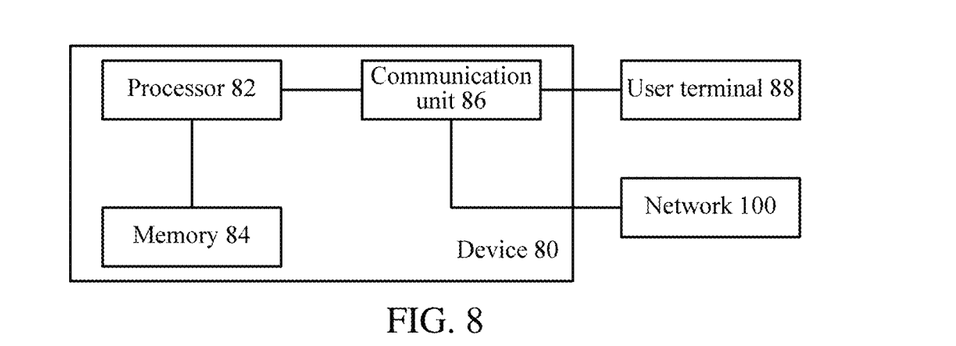
FIG. 8 is a structural block diagram of a device according to example embodiments.

FIG. 8 is a schematic block diagram of a device 80 according to example embodiments. As shown in FIG. 8, the device 80 includes at least one processor 82 and a memory 84, and optionally, includes a communication unit 86. As an instance, the device herein may be a server. The processor 82 may be considered as a control center of the device, and may be connected to other components in the device in a wired or wireless manner by using interfaces or lines. In an implementation, the processor 82 and the memory 84 may be connected by using a data bus. The processor 84 may be connected to a user terminal 88 and/or a network 100 in a wired or wireless manner by using an interface (which may be a wired interface or a wireless interface) or the communication unit 86, to exchange data and communicate with the exterior. Similarly, the memory 84 may include, but is not limited to, a ROM, a RAM, a CD-ROM, and another removable memory, and stores program code, functional modules, and the like. The memory 84 stores a computer program or functional modules. When the processor 82 calls and executes the computer program or the functional modules in the memory 84 by accessing the memory 84, the operations in example embodiments can be performed. For example, the operations of the elements shown in FIG. 5 may be performed. In addition, the example embodiments have been described in detail above with reference to the accompanying drawings, for example, the example embodiments described with reference to FIG. 2 to FIG. 4 and FIG. 5 to FIG. 7. To avoid unnecessarily obscuring the present disclosure, details are not described herein again.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The disclosure above describes example embodiments of inventive concepts, and the protection scope of the present disclosure cannot be defined thereby. Therefore, equivalent changes made according to the claims of the present disclosure are still covered by the scope encompassed by the present disclosure.

What is claimed is:

1. An electronic resource processing method comprising:
    sending, by a first terminal, an electronic resource transfer attribute to a second terminal;
    obtaining, by the second terminal, a target identifier for performing the electronic resource transfer processing, the target identifier comprising a device identifier of the second terminal, an user identifier of a user of the second terminal, or an account identifier of an associated account of the second terminal;
    performing, by the second terminal, first encryption processing on the target identifier, using a first preset encryption algorithm, to obtain an encryption identifier for performing electronic resource transfer processing;
    generating, by the second terminal, an electronic resource transfer request, by performing second encryption processing on the electronic resource transfer attribute and the encryption identifier, using a second preset encryption algorithm;
    sending, by the second terminal, the electronic resource transfer request to a server;
    querying, by the server, the associated account of the second terminal, based on the encryption identifier;
    performing, by the server, transfer processing on electronic resources in the associated account of the second terminal, based on the electronic resource transfer attribute; and
    notifying, by the server, the first terminal and the second terminal of a result of the transfer processing.

2. The method according to claim 1, further comprising obtaining, by the first terminal, the electronic resource transfer attribute comprising information of a receiver to which the first terminal belongs and a quantity of the electronic resources to be transferred,
    wherein the sending the electronic resource transfer attribute comprises sending, by the first terminal, the electronic resource transfer attribute to the second terminal via a short-distance communication protocol comprising near-field communication.

3. The method according to claim 1, further comprising:
    performing, by the server, first decryption processing on the electronic resource transfer request, using the second preset encryption algorithm, to obtain the electronic resource transfer attribute and the encryption identifier; and
    performing, by the server, second decryption processing on the encryption identifier, using the first preset encryption algorithm, to obtain the target identifier, wherein the querying the associated account comprises querying, by the server, the associated account of the second terminal, based on the target identifier.

4. The method according to claim 1, further comprising, in response to the querying the associated account, performing, by the server, security verification on the transfer processing,
wherein the performing the transfer processing comprises performing, by the server, in response to the security verification succeeding, the transfer processing on the electronic resources in the associated account of the second terminal, based on the electronic resource transfer attribute.

5. The method according to claim 4, wherein the performing the security verification comprises:
obtaining, by the server, a score of at least one risk factor of the transfer processing;
determining, by the server, an aggregate score of the at least one risk factor;
determining, by the server, that the security verification succeeds in response to the aggregate score of the at least one risk factor being less than or equal to a preset score threshold; and
in response to the aggregate score of the at least one risk factor being greater than the preset score threshold, sending, by the server, a security alert to the second terminal, and determining that the security verification succeeds in response to receiving a confirmation message that is fed back by the second terminal,
wherein the at least one risk factor comprises any one or any combination of a quantity of the electronic resources to be transferred exceeding a preset quantity threshold, a device identifier of the second terminal not being a preset frequently-used device identifier, a geographic location at which the second terminal is located not being a preset frequently-used place, a receiver to which the first terminal belongs being a preset high-risk user, and a request time of the electronic resource transfer request being a preset high-risk transaction time.

6. The method according to claim 1, further comprising:
performing, by the server, first decryption processing on the electronic resource transfer request, using the second preset encryption algorithm, to obtain the electronic resource transfer attribute and the encryption identifier, and
performing, by the server, second decryption processing on the encryption identifier, using first preset encryption algorithm, to obtain the target identifier,
wherein the querying the associated account comprises querying, by the server, the associated account of the second terminal, based on the target identifier.

7. Two or more non-transitory computer-readable storage media storing instructions for causing at least two computers to perform the method of claim 1.

8. An electronic resource processing method comprising:
receiving, by a server, an electronic resource transfer request from a second terminal, the electronic resource transfer request being generated by the second terminal, based on an encryption identifier for performing electronic resource transfer processing and an electronic resource transfer attribute that is received from a first terminal;
performing, by the server, first decryption processing on the electronic resource transfer request, using a second preset encryption algorithm, to obtain the electronic resource transfer attribute and the encryption identifier;
performing, by the server, second decryption processing on the encryption identifier, using a first preset encryption algorithm, to obtain a target identifier for performing the electronic resource transfer processing, the target identifier comprising a device identifier of the second terminal, an user identifier of a user of the second terminal, or an account identifier of an associated account of the second terminal;
querying, by the server, the associated account of the second terminal, based on the the target identifier;
performing, by the server, transfer processing on electronic resources in the associated account of the second terminal, based on the electronic resource transfer attribute; and
notifying, by the server, the first terminal and the second terminal of a result of the transfer processing.

9. The method according to claim 8, further comprising, in response to the querying the associated account, performing, by the server, security verification on the transfer processing,
wherein the performing the transfer processing comprises performing, by the server, in response to the security verification succeeding, the transfer processing on the electronic resources in the associated account of the second terminal, based on the electronic resource transfer attribute.

10. The method according to claim 9, wherein the performing the security verification comprises:
obtaining, by the server, a score of at least one risk factor of the transfer processing;
determining, by the server, an aggregate score of the at least one risk factor;
determining, by the server, that the security verification succeeds in response to the aggregate score of the at least one risk factor being less than or equal to a preset score threshold; and
in response to the aggregate score of the at least one risk factor being greater than the preset score threshold, sending, by the server, a security alert to the second terminal, and determining that the security verification succeeds in response to receiving a confirmation message that is fed back by the second terminal,
wherein the at least one risk factor comprises any one or any combination of a quantity of the electronic resources to be transferred exceeding a preset quantity threshold, a device identifier of the second terminal not being a preset frequently-used device identifier, a geographic location at which the second terminal is located not being a preset frequently-used place, a receiver to which the first terminal belongs being a preset high-risk user, and a request time of the electronic resource transfer request being a preset high-risk transaction time.

11. The method according to claim 8, wherein the electronic resource transfer attribute comprises information of a receiver to which the first terminal belongs and a quantity of the electronic resources to be transferred.

12. A non-transitory computer-readable storage medium storing instructions for causing a computer to perform the method of claim 8.

13. A device comprising:
a memory configured to store instructions; and
a processor configured to execute the instructions to:
receive an electronic resource transfer request from a second terminal, the electronic resource transfer request being generated by the second terminal, based on an encryption identifier for performing electronic resource transfer processing and an electronic resource transfer attribute that is received from a first terminal;

perform first decryption processing on the electronic resource transfer request, using a second preset encryption algorithm, to obtain the electronic resource transfer attribute and the encryption identifier;

perform second decryption processing on the encryption identifier, using a first preset encryption algorithm, to obtain a target identifier for performing the electronic resource transfer processing, the target identifier comprising a device identifier of the second terminal, an user identifier of a user of the second terminal, or an account identifier of an associated account of the second terminal;

query the associated account of the second terminal, based on the the target identifier;

perform transfer processing on electronic resources in the associated account of the second terminal, based on the electronic resource transfer attribute; and notify the first terminal and the second terminal of a result of transfer processing.

14. The device according to claim 13, wherein the processor is further configured to execute the instructions to:

in response to the querying the associated account, perform security verification on the transfer processing; and perform, in response to the security verification succeeding, the transfer processing on the electronic resources in the associated account of the second terminal, based on the electronic resource transfer attribute.

15. The device according to claim 14, wherein the processor is further configured to execute the instructions to:

obtain a score of at least one risk factor of the transfer processing;

determine an aggregate score of the at least one risk factor;

determine that the security verification succeeds in response to the aggregate score of the at least one risk factor being less than or equal to a preset score threshold; and in response to the aggregate score of the at least one risk factor being greater than the preset score threshold, send a security alert to the second terminal, and determine that the security verification succeeds in response to receiving a confirmation message that is fed back by the second terminal, wherein the at least one risk factor comprises any one or any combination of a quantity of the electronic resources to be transferred exceeding a preset quantity threshold, a device identifier of the second terminal not being a preset frequently-used device identifier, a geographic location at which the second terminal is located not being a preset frequently-used place, a receiver to which the first terminal belongs being a preset high-risk user, and a request time of the electronic resource transfer request being a preset high-risk transaction time.

16. The device according to claim 13, wherein the electronic resource transfer attribute comprises information of a receiver to which the first terminal belongs and a quantity of the electronic resources to be transferred.

17. The device according to claim 13, wherein the device comprises a server.

* * * * *